United States Patent
Porat et al.

(10) Patent No.: US 6,981,111 B1
(45) Date of Patent: Dec. 27, 2005

(54) DATA STORAGE SYSTEM

(75) Inventors: Ofer Porat, Westborough, MA (US);
Brian K. Campbell, Milford, MA (US); Jane Xu, Franklin, MA (US);
Eric J. Bruno, Marlborough, MA (US)

(73) Assignee: EMC Corporation, Hopkinton, MA (US)

(*) Notice: Subject to any disclaimer, the term of this patent is extended or adjusted under 35 U.S.C. 154(b) by 424 days.

(21) Appl. No.: 10/403,263

(22) Filed: Mar. 31, 2003

(51) Int. Cl.[7] ............................................. G06F 12/00
(52) U.S. Cl. ...................................... 711/154; 711/156
(58) Field of Search ................................ 711/154, 156; 340/426.15

(56) References Cited

U.S. PATENT DOCUMENTS 5,608,869 A * 3/1997 Hamstra et al. ............ 709/250
6,356,984 B1 * 3/2002 Day et al. ................... 711/147

FOREIGN PATENT DOCUMENTS

JP 03186900 A * 8/1991 ............. G10L 9/14

* cited by examiner

Primary Examiner—Matthew D. Anderson

(57) ABSTRACT

A system and method are provided for transferring data appended with a tag indicating whether the transmit data is data allowed to be re-transmitted or inhibited from being re-transmitted to a memory section. A buffer is fed with the transmit data from a data source for transmit data to the memory section. A receiver is receives data from the memory section and checks such received data for errors. Either the transmit data from the data source is coupled to the memory section in absence of a detected error or the data in the buffer is coupled to the memory section when an error has been detected and the data has been tagged with an indication that the transmit data is data allowed to be re-transmitted; selectively.

13 Claims, 3 Drawing Sheets

DATA STORAGE SYSTEM

INCORPORATION BY REFERENCE

This application incorporates by reference, in their entirety, the following co-pending patent applications all assigned to the same assignee as the present invention:

| INVENTORS | FILING DATE | SER. NO. | TITLE |
| --- | --- | --- | --- |
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-to-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| John K. Walton | Dec. 30, 2002 | 10/331,366 | Data Storage System Having Atomic Memory Operation |

TECHNICAL FIELD

This invention relates generally to data storage systems, and more particularly to systems for transmitting data to a memory of such system.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

As is also known in the art, in one such system the director issues commands to the memory across a serial line on a backplane. Such system is described in U.S. patent application Ser. No. 09/540,828, filed Mar. 31, 2000, entitled "Data Storage System Having Separate Data Transfer Section And Message Network", inventors Yuval Ofek et al., assigned to the same assignee as the present invention, the entire subject matter thereof being incorporated herein by reference. In such system, the directors are disposed on director printed circuit boards and the memory is made up of a plurality of memory arrays disposed on a plurality of memory printed circuit boards. The director boards and the memory printed circuit boards plug into a common printed circuit board backplane. The electrical interconnections between the director boards and the memory boards are made by serial busses formed on the backplane.

In such system, when data is transmitted from a director to the memory via the backplane, any data corruption in such transfer from a single bit error is detected by the memory. The detected error is reported to software in such director. The software stops the current data transfer, reset all status and control registers on the director, and then retries the entire data transfer. Each data transfer is broken up into packets of data no larger than 8, 64 bit words of data to be written or read from the memory.

As is also known in the art, it is frequently desired to perform certain types of operations using logic on the memory printed circuit board. One such operation is referred to as read-modify-write operation. More particularly, multi-bit data is read from a particular location in the memory, modified with the logic on the memory board, and then the modified data is written back into the same memory location from which it was originally read.

More particularly, in transferring data to the memory for performance of such read-modify-write operation, the director appends a read-modify-write command to the data and the data and the appended command are sent to the memory. The memory detects the read-modify-write command and uses logic internal to the memory to perform such read-modify-write command.

SUMMARY OF THE INVENTION

In accordance with the present invention, a system and method are provided for transferring data. The system includes a memory section having a memory array. The memory section also includes logic adapted to perform at least one predetermined operation on transmit data fed to the memory section prior to such transmit data being stored in the memory array when such data has an indication that predetermined operation is to be performed on such transmit data in the memory section. The system includes a data source for providing the transmit data for storage in the memory array. The transmit data is appended with a tag, such tag indicating whether the transmit data is data allowed to be re-transmitted or inhibited from being re-transmitted. The tag is a function of whether the transmit data has the indication such predetermined operation is to be performed on such transmit data in the memory section. The system includes a decoder for decoding the tag for providing a first control signal indicating whether the transmit data has been tagged with an indication that the transmit data is allowed to be re-transmitted or has been tagged with an indication that the transmit data is data inhibited from being re-transmitted. A buffer is fed with the transmit data from the data source for storing such transmit data. A receiver is provided for receiving data from the memory section, such receiver checking for errors in the received data, such receiver providing a second control signal indicating whether such received data has an error. Logic is included which is responsive to the first control signal and the second control signal, for producing a third control signal, such third control signal indicating: (a) whether an error has been detected by the receiver and the transmit data has been tagged indicating the transmit data is allowed to be re-transmitted; or, (b) whether an error has been detected in the receiver and the transmit data has been tagged indicating the transmit data is inhibited from being re-transmitted. A multiplexer is responsive to the third control signal. The multiplexer includes: a first input fed with the transmit data from the data source; a second input fed with the output of the buffer; and an output coupled the memory section. The multiplexer couples either: the first input to the output in the absence of a detected error; or coupling the second input to the output an when an error has been detected and the data has been tagged with an indication that the transmit data is data allowed to be re-transmitted; selectively, in accordance with the third control signal.

In one embodiment, wherein the logic producing the third control signal indicates: (a) whether an error has been detected by the receiver and the transmit data has been tagged indicating the transmit data is allowed to be re-transmitted; (b) whether an error has been detected in the receiver and the transmit data has been tagged indicating the transmit data is inhibited from being re-transmitted; or (c) whether the transmit data had been previously transmitted regardless of the tag indication.

In one embodiment, the multiplexer coupling either:(a) the first input to the output in the absence of a detected error; (b) the second input to the output an when an error has been detected and the data has been tagged indicating the transmit data is data is allowed to be re-transmitted and that it has not been previously transmitted selectively, selectively in accordance with the third control.

In one embodiment, the buffer is a FIFO.

In one embodiment the tag indicates a read-modify-write command.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other features of the invention will become more readily apparent from the following detailed description when read together with the accompanying drawings, in which.

DETAILED DESCRIPTION

Figure 1:
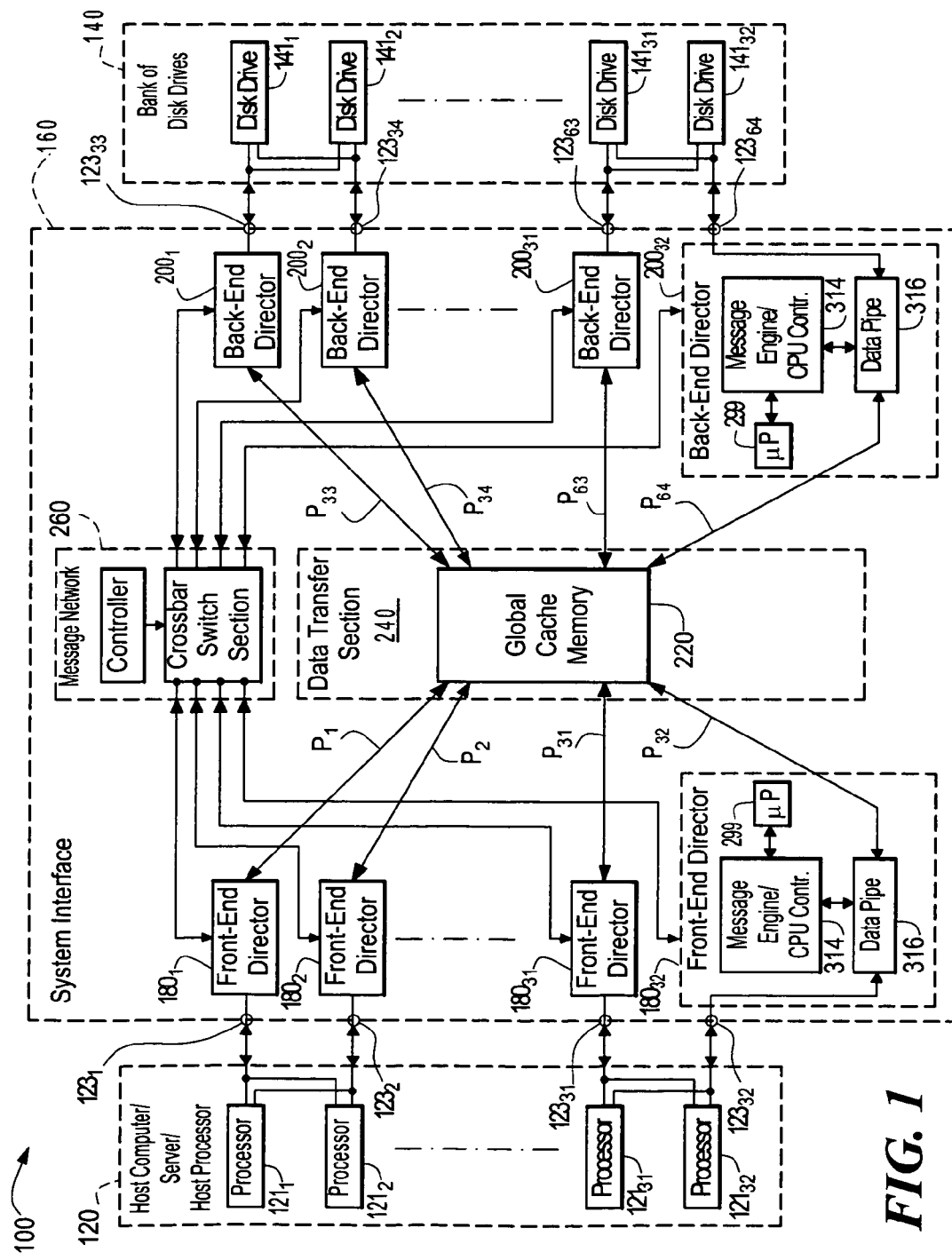
FIG. 1 is a block diagram of a data storage system according to the invention.

Referring now to FIG. 1, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{16}$ and the back-end directors $200_1$–$200_{16}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor ($\mu$P) 299 (i.e., a central processing unit (CPU) and RAM), a message engine/CPU controller 314 and a data pipe 316, described in detail in the co-pending patent applications referred to above. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240. More particularly, in the case of the front-end directors $180_1$–$180_{32}$, the data passes between the host computer to the global cache memory 220 through the data pipe 316 in the front-end directors $180_1$–$180_{32}$ and the messages pass through the message engine/CPU controller 314 in such front-end directors $180_1$–$180_{32}$. In the case of the back-end directors $200_1$–$200_{32}$, the data passes between the back-end directors $200_1$–$200_{32}$ and the bank of disk drives 140 and the global cache memory 220 through the data pipe 316 in the back-end directors $200_1$–$200_{32}$ and again the messages pass through the message engine/CPU controller 314 in such back-end director $200_1$–$200_{32}$. With such an arrangement, the cache memory 220 in the data transfer section 240 is not burdened with the task of transferring the director messaging. Rather the messaging network 260 operates independent of the data transfer section 240 thereby increasing the operating bandwidth of the system interface 160.

Figure 2:
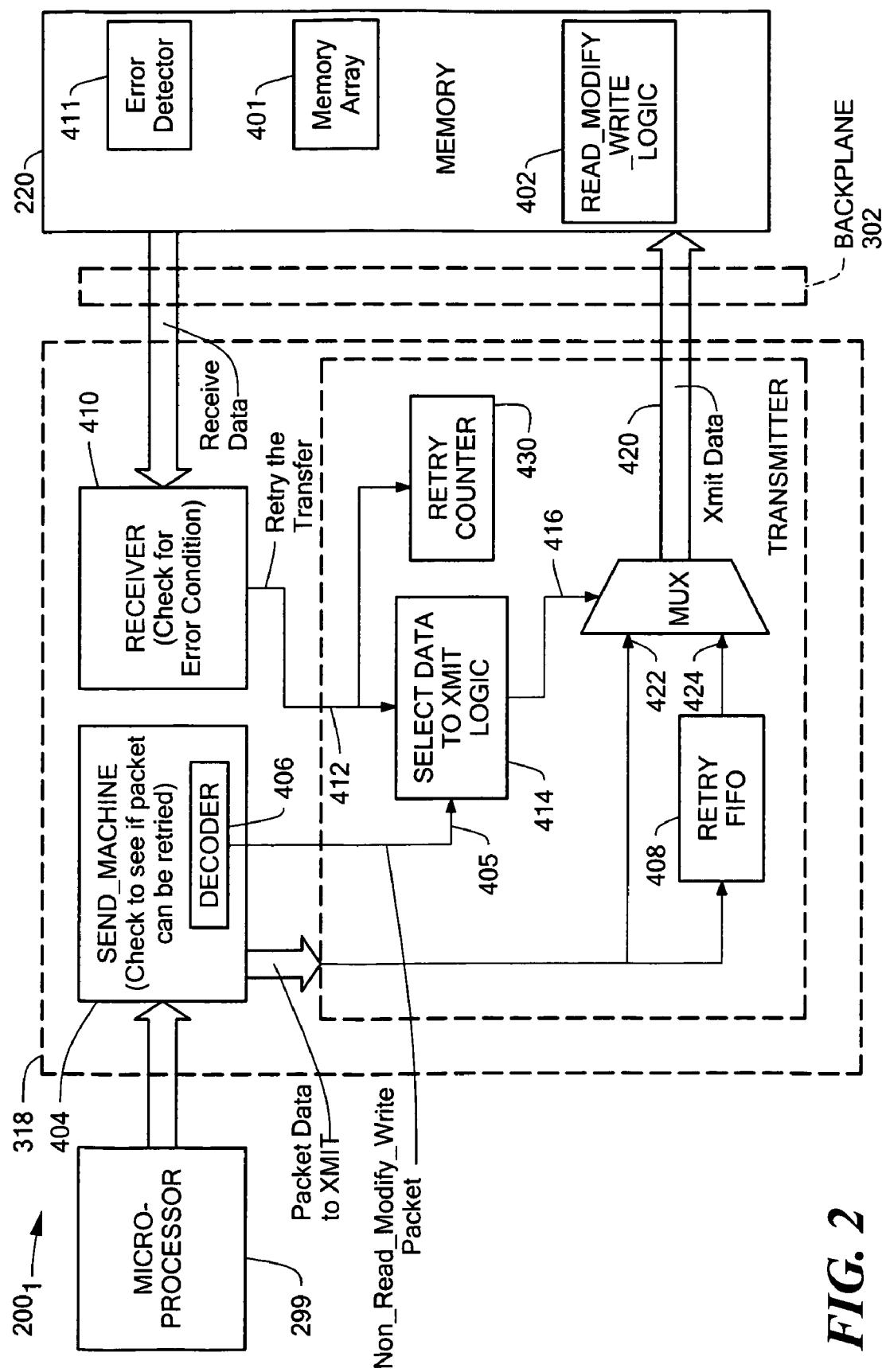
FIG. 2 is a block diagram of a portion of an exemplary one of a plurality of directors used in the system of FIG. 1.

Referring now to FIG. 2, a portion of an exemplary one of the directors, here director 200 is shown coupled to an exemplary one of a plurality of memory boards 220' providing the global cache memory 220. The memory boards 220' and the director $200_1$ are interconnected through a backplane printed circuit board 302 as described in more detail in the above referenced U.S. patent application Ser. No. 09/540,828. The memory board 220' includes a memory array 401; and logic 402 adapted to perform at least one predetermined operation, e.g., a read-modify-write operation on transmit data fed to the memory section prior to such transmit data being stored in the memory array when such data has an indication such predetermined operation is to be performed on such transmit data in the memory section.

The director $220_1$ includes, in a switch 318 thereof, a send_machine 404 coupled to the microprocessor 299. More particularly, the microprocessor 299 serves as a data source for providing the transmit data for storage in the memory array 401. The transmit data is appended with a tag. The tag indicates whether the transmit data is data allowed to be re-transmitted or inhibited from being re-transmitted. The tag is a function of whether the transmit data has the indication such predetermined operation, here a read-modify-write operation, is to be performed on such transmit data in the memory 220'.

The send_machine 404 includes a decoder 406 for decoding the tag for providing a first control signal on line 405 indicating whether the transmit data has been tagged with indicating the transmit data is allowed to be re-transmitted or has been tagged with an indication that the transmit data is data inhibited from being re-transmitted. Thus, if a read-modify-write operation is to be performed, the transmit data inhibited from being re-transmitted.

A buffer 408, here a FIFO, is fed with the transmit data from the send_machine 404 for storing a copy of the transmit data.

The director 200, includes a receiver 410 for receiving data from the memory board 220'. The receiver 410 checks for errors, such as CRC errors, in the receive data. The receiver 410 provides a second control signal on line 412 indicating whether such receive data from the memory 220' has an error. The receiver 410 also receives any error indications from an error detector 411 in the memory 200' when the memory 220' detects an error, such as a CRC error, in the data the memory 220' receives from the director 200, through the backplane 302.

A Select_Data_To_Transmit logic section 414 is included in the director $200_1$. The Select_Data_To_Transmit logic section 414 is responsive to the first control signal on line 405 and the second control signal on line 412, for producing a third control signal on line 416. The third control signal on line 416 indicates: (a) whether an error has been detected in the receive data in view of the second control signal on line 412 and the transmit data has been tagged with an indication that the transmit data is allowed to be re-transmitted in view of the first control signal on line 405; (2) whether an error has been detected in the receive data in view of the second control signal on line 412 and the transmit data has been tagged with an indication that the transmit data is inhibited from being re-transmitted in view of the first control signal on line 405; or (3) whether the data transfer had been preciously transmitted regardless of the tag indication.

The director 200, includes a multiplexer 420, responsive to the third control signal on line 416. The multiplexer 420 includes a first input 422 fed with the transmit data from the send_machine 404 and a second input 424 fed with the output of the buffer 408. The multiplexer 420 includes an output coupled the memory board 220' via the backplane 302. The multiplexer 420 couples either: (a) the first input 422 to the output in the absence of a detected error; (b) the second input 424 to the output an when an error has been detected and the data has been tagged indicating the transmit data is data is allowed to be re-transmitted and that it has not been previously transmitted selectively, in accordance with the third control signal on line 416.

More particularly, it is noted that there are three types of transfers initiated by the director $220_1$: (a) a write transfer wherein data is transmitted to the memory for storage in such memory 220', i.e., a memory write; (b) a read transfer where the director $220_1$ transmits to the memory 220' the address of the memory location which stores the data to be read (i.e., a memory read); and, (c) transfers inhibited from being re-transmitted in the event of error detection, such as a read-modify-write operation.

With a write operation, the data (i.e., information) sent to the memory 220' by the director 200, includes the data to be stored, the memory address for the data, and a write command. This data is sent to the memory 220' through the backplane 302. The memory 220' checks the information sent to it by the director 200, for errors, such as CRC errors, in error detector 411. If an error is detected an error indication is sent from the memory 220' to the director $200_1$. In response to the error indication, receiver 410 produces a control signal on line 416 to enable the same information, which is now stored in the buffer (FIFO) 408, to be re-transmitted to the memory 220'.

With a read operation, the information sent to the memory 220' by the director 200, includes the address of the data to be read, and a read command. This information is sent to the memory 220' through the backplane 302. The memory 220' checks the information sent to it by the director for errors, such as CRC errors, in error detector 411. If an error is detected an error indication is sent from the memory 220' to the director $200_1$. In response to the error indication, receiver 410 produces a control signal on line 416 to enable the same information, which is now stored in the buffer (FIFO) 408, to be re-transmitted to the memory 220' unless it was previously transmitted.

With a read-modify-write operation, say where data in the memory 220' is to be read from address x and incremented by an amount y and the incremented value stored in the memory 220' at location x, the information sent to the memory 220' from the send_machine 404 includes the address of the data to be read, (i.e., x) the amount the read data is to be incremented (i.e., y) and the read-modify-write command. This information is sent to the memory 220' through the backplane 302. The memory 220' checks the information sent to it by the director for errors, such as CRC errors, in error detector 411. If an error is detected an error indication is sent from the memory 220' to the director $200_1$. In response to the error indication, receiver 410 produces a control signal on line 416 to inhibit the data which is now stored in the buffer (FIFO) 408, from being re-transmitted to the memory 220'.

All data received by the director 200, from the memory 220' is also checked for errors in the receiver 410. If an error in such receive data is detected by the receiver 410 of the director $200_1$, the information is retransmitted to the memory 220' from the buffer 408 unless there was a read-modify-write tag and such information was not previously transmitted. That is, the information in the FIFO is not re-transmitted to the memory 220' when there has been a read-modify-write operation or if such information was previously transmitted.

Thus, each data (i.e., a packet having data, address, and command, etc.) that is to be transmitted by the send_machine 404 to the memory 220' is evaluated and designated with the tag either as a packet that can or cannot be retransmitted. Not all packets can to be retransmitted. There are some memory operations which are not "allowed be retransmitted"; e.g., if a packet performs the "read-modify-write" operation then it cannot be retransmitted. This is because it can be impossible to tell if the packet was or was not executed by the memory section. For example, assume the command from the processor 299 is: Read the value in the memory array at address x; increment the value by 1; and, then stored the incremented value in the memory array at location x. Assume that the memory section receives the command correctly and increments the value at address x by 1 correctly. Assume also that the response for the "increment by one" command from the memory 220' to the processor 299 is corrupted due to a single bit error on the backplane link.

If, in response to an error detected by the receiver when the data at address x is read from the memory, the transmitter were to retransmits the "increment by one" command then the value at address x would again be incremented by 1 a second time and the value at address x will have been incremented by 2, which would be an incorrect and corrupt value.

Here, with the system shown, all packets that enter the transmitter of the processor are sent to the multiplexer 420 and to the buffer 408. For a transfer without errors, the packet is transmitted from the processor to the memory 220' through the multiplexer 420. The data also goes to the buffer 424 to be stored in case of an error. Thus, a copy of the transmit data is stored in the FIFO 408.

If this command packet is an "allowed to be transmitted" one, then the transmitter will retransmit the packet from the data stored in the buffer 424. If the command is not allowed to be retransmitted then the error is reported back to the processor for the software to handle.

If the retried command receives an additional error then the command will not be re-tried another time but will be reported back to the processor for the software to handle. If the retried packet completes successfully then the receiver will give a status indicating that a re-try occur, but will not send the error that caused the retried condition in the status returned to software. The error will be latched in a director 200₁ register, not shown, in the receiver that can be read by software.

The buffer 408 is cleared at the start of each new packet that is sent.

The receiver also keeps track of how many retry error events have occurred in counter 430, so software can monitor the error rate of the backplane link. The retry counter is here, for example, four bits wide and increments each time a retry error occurs. When the counter 430 reaches its maximum value, here fifteen, then it holds the value. Software resets the counter to zero by performing a write to an internal register, not shown, in the receiver.

Figure 3:
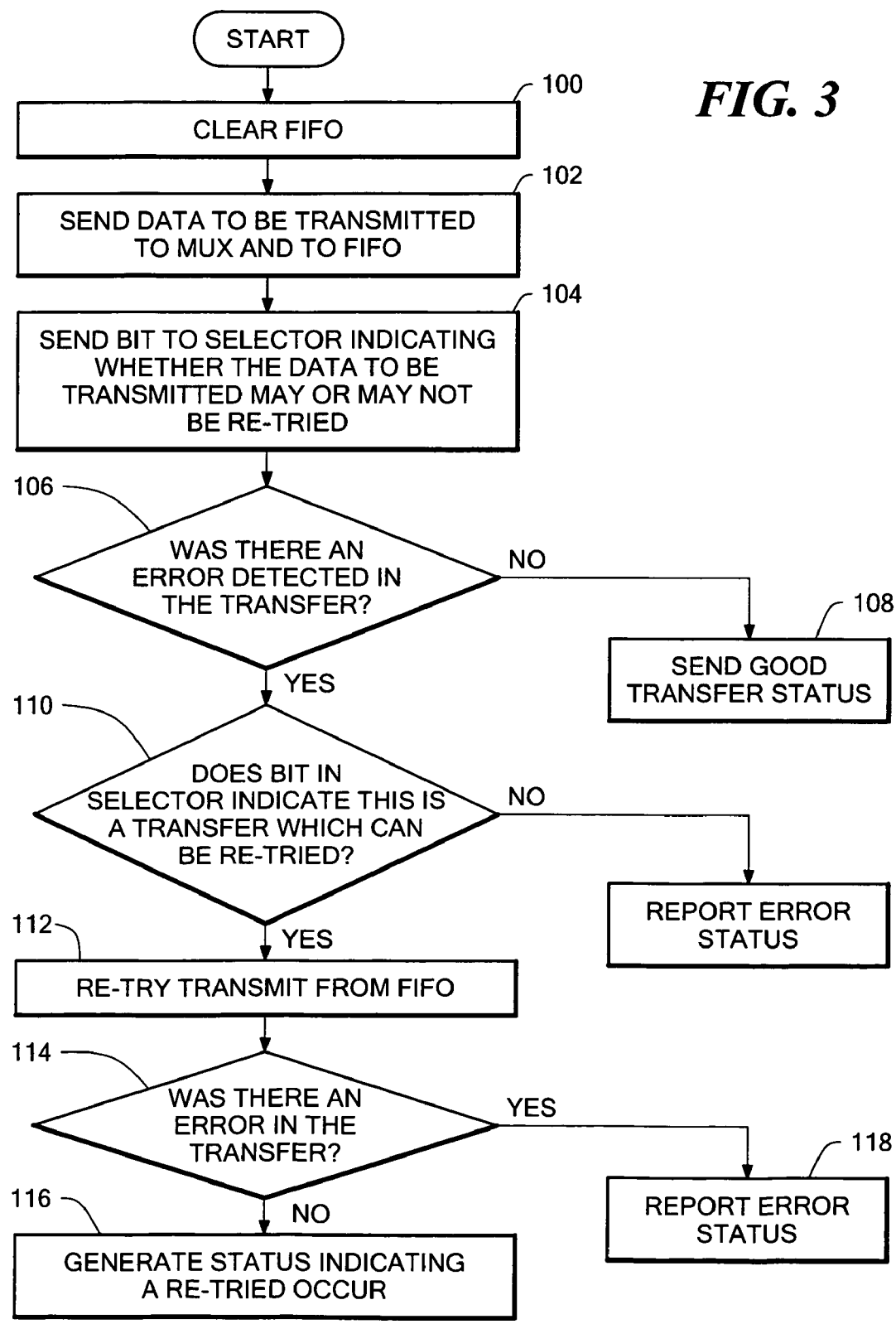
FIG. 3 is a flow diagram of a processed used by the director of FIG. 2 in transferring data from such director to a memory board used in the system of FIG. 1.

Referring now to FIG. 3, in a flow diagram of a program stored in the processor is shown.

In Step 100, the send machine 406 clears, or reset, the FIFO buffer 408.

In Step 102, the send_machine 404 sends transmit data from the processor 299 to the first input 422 of the multiplexer 420 and also to the FIFO buffer 408. In Step 104 the decoder 406 in the send_machine 404 sends a bit to the logic 414 and then to the multiplexer indicating whether the data to be transmitted may, or may not be retried.

In Step 106, data read from the memory 220' is examined by the receiver 410 to determine whether or not such data has an error. If no error is detected, a "good" transfer is stored in a status register, not shown, of the receiver (Step 108).

On the other hand, if an error is detected in Step 106 and if not previously transmitted, the bit sent by the decoder 406 in the send_machine 404 indicates that this transfer can be retried in Step 110 and has not been previously transmitted, the multiplexer 420 couples the FIFO buffer copy of the previously sent information through the multiplexer 410 to the memory 220', (Step 112).

Data read from the memory 220' is examined by the receiver 410 to determine whether or not such data has an error, Step 114. If no error is detected, a "good re-try" transfer status is sent back to the processor.

If, on the other hand, there was an error in the retried transfer (Step 114), the error is reported to the processor and also is stored in the status register, not shown.

On the other hand, if in Step 110 the bit sent by the decoder 406 in the send_machine 404 indicates that this transfer cannot be re-tried, the error is reported back to the processor and stored in the status register, not shown, Step 118 and the transfer is inhibited to be transmitted.

Other embodiments are within the spirit and scope of the appended claims.

What is claimed is:

1. A system for transferring data, such system comprising:
   a memory section comprising:
   a memory array;
   logic adapted to perform at least one predetermined operation on transmit data fed to the memory section prior to such transmit data being stored in the memory array when such data has an indication such predetermined operation is to be performed on such transmit data in the memory section;
   a data source for providing the transmit data for storage in the memory array, such transmit data being appended with a tag, such tag indicating whether the transmit data is data allowed to be re-transmitted or inhibited from being re-transmitted, such tag being a function of whether the transmit data has the indication such predetermined operation is to be performed on such transmit data in the memory section;
   a decoder for decoding the tag for providing a first control signal indicating whether the transmit data has been tagged with an indication that the transmit data is allowed to be re-transmitted or has been tagged with an indication that the transmit data is data inhibited from being re-transmitted;
   a buffer fed with the transmit data from the data source for storing such transmit data;
   a receiver for receiving data from the memory section, such receiver checking for errors in the received data, such receiver providing a second control signal indicating whether such received data has an error;
   logic, responsive to the first control signal and the second control signal, for producing a third control signal, such third control signal indicating: (a) whether an error has been detected by the receiver and the transmit data has been tagged indicating the transmit data is allowed to be re-transmitted; or, (b) whether an error has been detected in the receiver and the transmit data has been tagged indicating the transmit data is inhibited from being re-transmitted; and
   a multiplexer, responsive to the third control signal, such multiplexer comprising:
   a first input fed with the transmit data from the data source; and
   a second input fed with the output of the buffer; and
   an output coupled the memory section;
   such multiplexer coupling either: the first input to the output in the absence of a detected error; or coupling the second input to the output an when an error has been detected and the data has been tagged with an indication that the transmit data is data allowed to be re-transmitted; selectively, in accordance with the third control signal.

2. The system recited in claim 1 wherein the logic producing the third control signal indicating: (a) whether an error has been detected by the receiver and the transmit data has been tagged indicating the transmit data is allowed to be re-transmitted; (b) whether an error has been detected in the receiver and the transmit data has been tagged indicating the transmit data is inhibited from being re-transmitted; or (c) whether the transmit data had been previously transmitted regardless of the tag indication.

3. The system recited in claim 2 wherein such multiplexer coupling either:(a) the first input to the output in the absence of a detected error; (b) the second input to the output an when an error has been detected and the data has been tagged indicating the transmit data is data is allowed to be re-transmitted and that it has not been previously transmitted selectively, in accordance with the third control.

4. The system recited in claim 1 wherein the buffer is a FIFO.

5. The system recited in claim 1 wherein the tag indicates a read-modify-write command.

6. The system recited in claim 5 wherein the logic producing the third control signal indicating: (a) whether an error has been detected by the receiver and the transmit data has been tagged indicating the transmit data is allowed to be re-transmitted; (b) whether an error has been detected in the receiver and the transmit data has been tagged indicating the transmit data is inhibited from being re-transmitted; or (c) whether the transmit data had been previously transmitted regardless of the tag indication.

7. The system recited in claim 6 wherein such multiplexer coupling either:(a) the first input to the output in the absence of a detected error; (b) the second input to the output an when an error has been detected and the data has been tagged indicating the transmit data is data is allowed to be re-transmitted and that it has not been previously transmitted selectively, selectively in accordance with the third control.

8. A method for transferring data, comprising:
providing the transmit data for storage in a memory, such transmit data being appended with a tag, such tag indicating whether the transmit data is allowed to be re-transmitted or inhibited from being re-transmitted, such tag being a function of whether the transmit data has an indication a predetermined operation is to be performed on such transmit data in the memory;
decoding the tag to provide a first control signal indicating whether the transmit data has been tagged with an indication that the transmit data is allowed to be re-transmitted or has been tagged with an indication that the transmit data is data inhibited from being re-transmitted;
transmitting the transmit data to the memory and storing a copy of the transmit data in a buffer;
receiving data from the memory section;
checking such received data for errors;
providing a second control signal indicating whether such received data has an error;
producing a third control signal indicating (a) whether an error has been detected by the receiver and the transmit data has been tagged indicating the transmit data is allowed to be re-transmitted; or, (b) whether an error has been detected in the receiver and the transmit data has been tagged indicating the transmit data is inhibited from being re-transmitted; and
coupling to the memory the stored transmit data when an error has been detected and the transmit data has been tagged with an indication that the transmit data is data allowed to be re-transmitted.

9. The method recited in claim 8 producing the third control signal includes determining whether the transmit data had been previously transmitted regardless of the tag indication.

10. The system recited in claim 9 wherein such coupling comprises coupling either:(a) the first input to the output in the absence of a detected error; (b) the second input to the output an when an error has been detected and the data has been tagged indicating the transmit data is data is allowed to be re-transmitted and that it has not been previously transmitted selectively, selectively in accordance with the third control.

11. The method recited in claim 10 wherein the tag indicates the predetermined operation is a read-modify-write transfer, such operation being inhibited from being re-transmitted.

12. A method for transferring data to a memory section comprising: a memory array; and logic adapted to perform at least one predetermined operation on transmit data fed to the memory section prior to such transmit data being stored in the memory array when such data has an indication such predetermined operation is to be performed on such transmit data in the memory section, such method comprising:
providing the transmit data for storage in the memory array, such transmit data being appended with a tag, such tag indicating whether the transmit data is data allowed to be re-transmitted or inhibited from being re-transmitted, such tag being a function of whether the transmit data has the indication such predetermined operation is to be performed on such transmit data in the memory section;
decoding the tag to provide a first control signal indicating whether the transmit data has been tagged indicating the transmit data is allowed to be re-transmitted or has been tagged indicating that the transmit data is data inhibited from being re-transmitted;
transmitting the transmit data to the memory and storing a copy of the transmit data in a buffer;
receiving data from the memory section;
checking such received data for errors;
providing a second control signal indicating whether such receive data has an error;
producing a third control signal indicating (a) whether an error has been detected and the transmit data has been tagged indicating the transmit data is allowed to be re-transmitted; or, (b) whether an error has been detected and the transmit data has been tagged indicating the transmit data is inhibited from being re-transmitted; and
coupling to the memory section either: the transmit data in the absence of an error being detected in the receive data; or coupling the stored transmit data to the memory when an error has been detected and the data has been tagged indicating the transmit data is allowed to be re-transmitted and it was not retransmitted before; selectively, in accordance with the third control signal.

13. The method recited in claim 12 wherein the tag indicates the predetermined operation is a read-modify-write transfer, such operation being inhibited from being re-transmitted.

* * * * *